(12) United States Patent
Sueoka et al.

(10) Patent No.: US 7,510,762 B1
(45) Date of Patent: *Mar. 31, 2009

(54) ORIENTED GRAPHITE FILM, METHODS OF MANUFACTURE THEREOF AND ARTICLES COMPRISING THE SAME

(75) Inventors: Kuniaki Sueoka, Kanagawa-ken (JP); Yoichi Taira, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/133,719

(22) Filed: Jun. 5, 2008

Related U.S. Application Data

(63) Continuation of application No. 11/945,523, filed on Nov. 27, 2007, now Pat. No. 7,396,494.

(51) Int. Cl.
 *D04H 1/00* (2006.01)
 *B32B 15/04* (2006.01)
 *D02G 3/00* (2006.01)

(52) U.S. Cl. .................. 428/292.1; 428/86; 428/90; 428/96; 428/97; 428/293.1; 428/297.4; 428/399; 428/400; 428/408; 428/902; 252/378 R; 252/500; 252/502; 252/510; 252/511; 423/447.1; 423/447.2; 423/447.3; 361/704; 361/709; 524/492; 524/493; 524/494; 524/495; 524/496

(58) Field of Classification Search .............. 428/86, 428/90, 96, 97, 292.1, 293.1, 295, 297.4, 428/367, 374, 375, 399, 400, 902; 252/378 R, 252/500, 502, 510, 511; 361/704, 709; 423/447.1, 423/447.2, 447.3; 524/492–497
See application file for complete search history.

(56) References Cited

U.S. PATENT DOCUMENTS

| | | | |
|---|---|---|---|
| 4,382,882 A | * | 5/1983 | Vogel et al. .................. 252/503 |
| 5,270,106 A | | 12/1993 | Orlowski et al. |
| 5,599,615 A | | 2/1997 | Swift et al. |

* cited by examiner

*Primary Examiner*—D. L Tarazano
*Assistant Examiner*—Camie S Thompson
(74) *Attorney, Agent, or Firm*—Cantor Colburn LLP; Vazken Alexanian

(57) ABSTRACT

Disclosed herein is a composite film comprising a layer of an organic polymer, wherein the organic polymer is an elastomer; the organic polymer having an elastic modulus of less than or equal to about $10^5$ Pascals when measured at room temperature; and a bundle of carbon fibers disposed in the layer of organic polymer; each bundle comprising a column and an end face; each bundle also having a longitudinal axis that is substantially parallel to the column and passes through the center of the column; the end face of the carbon fiber bundle intercalated with nitrate ions and fibrillated so as to have a surface area measured perpendicular to the longitudinal axis that is about 110% to about 250% greater than the surface area of a cross-section of the carbon fiber bundle measured at the column.

2 Claims, 4 Drawing Sheets

ORIENTED GRAPHITE FILM, METHODS OF MANUFACTURE THEREOF AND ARTICLES COMPRISING THE SAME

CROSS-REFERENCE TO RELATED APPLICATION

This application is a continuation of U.S. patent application Ser. No. 11/945,523 now U.S. Pat. No. 7,396,494, filed Nov. 27, 2007, the disclosure of which is incorporated by reference herein in its entirety.

BACKGROUND

This disclosure relates to oriented graphite films, methods of manufacture thereof and articles comprising the same.

Carbon fibers have excellent mechanical, electrical and thermal characteristics, which have made them useful in a wide variety of commercial applications. In recent years, they have been investigated as materials of choice for thermal conduction or for use as electrodes for fuel cells. Carbon fibers generally comprise microfibril aggregates aligned in parallel to the longitudinal direction of the fibers and therefore possess anisotropic electrical and thermal properties. Thus, in order to utilize the carbon fibers and their properties effectively, it is desirable to use them in the appropriate orientation for the particular application.

Oriented carbon fibers are often used in composite films. However, these composite films have contact problems with electrodes or substrates that are opposedly disposed to the end faces of the carbon fiber, particularly used in electrical and/or thermal applications. The problem is that the electrical/thermal resistance caused at the contact point leads to a considerable reduction of the application characteristics as a whole. The high crystallinity and the hardness of carbon fibers that produce excellent thermal and electrical conduction characteristics, make it difficult for the end face to contact the opposing surface, which results in a reduction of the effective electrical/thermal contact area. It is therefore desirable to improve the ability of the end face of the carbon fibers to contact an opposing surface, while at the same time preserving the crystalline content and the hardness of the carbon fibers.

SUMMARY

Disclosed herein is a method comprising fabricating carbon fiber bundles from chopped carbon fibers; disposing the chopped carbon fibers in a mold; disposing a organic polymer into the mold; immersing the chopped carbon fibers in the organic polymer to form immersed chopped carbon fibers; pressurizing the immersed chopped carbon fibers in the mold; annealing the immersed chopped carbon fibers to form a carbon fiber block; slicing the carbon fiber block to form a plurality of carbon fiber sheets; each carbon fiber sheet having a longitudinal axis that is substantially parallel to respective carbon fibers in the bundle; intercalating an end face of a carbon fiber bundle in the carbon fiber sheet with nitrate ions; the intercalating being conducted by immersing the carbon fiber sheet into an electrolytic bath comprising nitric acid; illuminating the end face of the carbon fiber bundle with a pulse laser; and fibrillating the end face of the carbon fiber bundle to form a composite film.

Disclosed herein too is a composite film comprising a layer of an organic polymer, wherein the organic polymer is an elastomer; the organic polymer having an elastic modulus of less than or equal to about $10^5$ Pascals when measured at room temperature; and a bundle of carbon fibers disposed in the layer of organic polymer; each bundle comprising a column and an end face; each bundle also having a longitudinal axis that is substantially parallel to the column and passes through the center of the column; the end face of the carbon fiber bundle intercalated with nitrate ions and fibrillated so as to have a surface area measured perpendicular to the longitudinal axis that is about 110% to about 250% greater than the surface area of a cross-section of the carbon fiber bundle measured at the column.

Disclosed herein too is an article comprising the aforementioned composite film.

DETAILED DESCRIPTION

Disclosed herein is a composite film comprising oriented carbon fibers; the end faces of the respective oriented carbon fibers having excellent contact characteristics with an opposing surface. These contact characteristics are achieved by the expansion and fibrillation of the respective oriented carbon fibers at their end faces through a short-pulse laser treatment or its manufacturing process. Since the short-pulse laser treatment is a low temperature-process, organic resin materials, which are usually inadequate for high-temperature processing, can be advantageously used to bundling the carbon fibers prior to the laser treatment. The expansion and fibrillation of the oriented carbon fibers results in contacts that utilize the thermal and electrical characteristics inherent in carbon fibers while retaining the crystallinity and mechanical strength.

Figure 1:
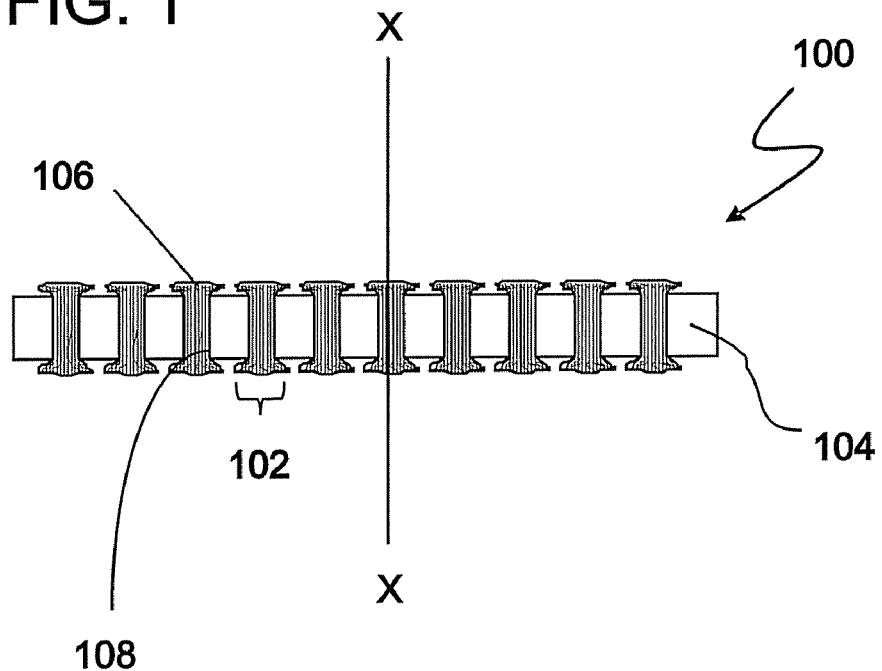
FIG. 1 depicts the composite film comprising a plurality of bundles of carbon fibers disposed in a layer of the organic polymer.

With reference now to the FIG. 1, the composite film 100 comprises a plurality of bundles of carbon fibers 102 disposed in a layer of an organic polymer 104. Each bundle of carbon fibers 102 comprises an end face 106 that comprises expanded carbon fibers; the end face having a shape that resembles a disc. The end face 106 contacts a column 108 of the bundle of carbon fibers 102. Each column 108 of the bundle of carbon fibers 102 have a longitudinal axis XX that is parallel to the length of the column 108 and passes through the center of the column 108. The end face 106 extends from the layer of organic polymer 104 while the column 108 is embedded within the layer of organic polymer 104. The surface area of a cross-section of the column 108 is substantially the same throughout the length of the column 108.

Figures 2, 2A:
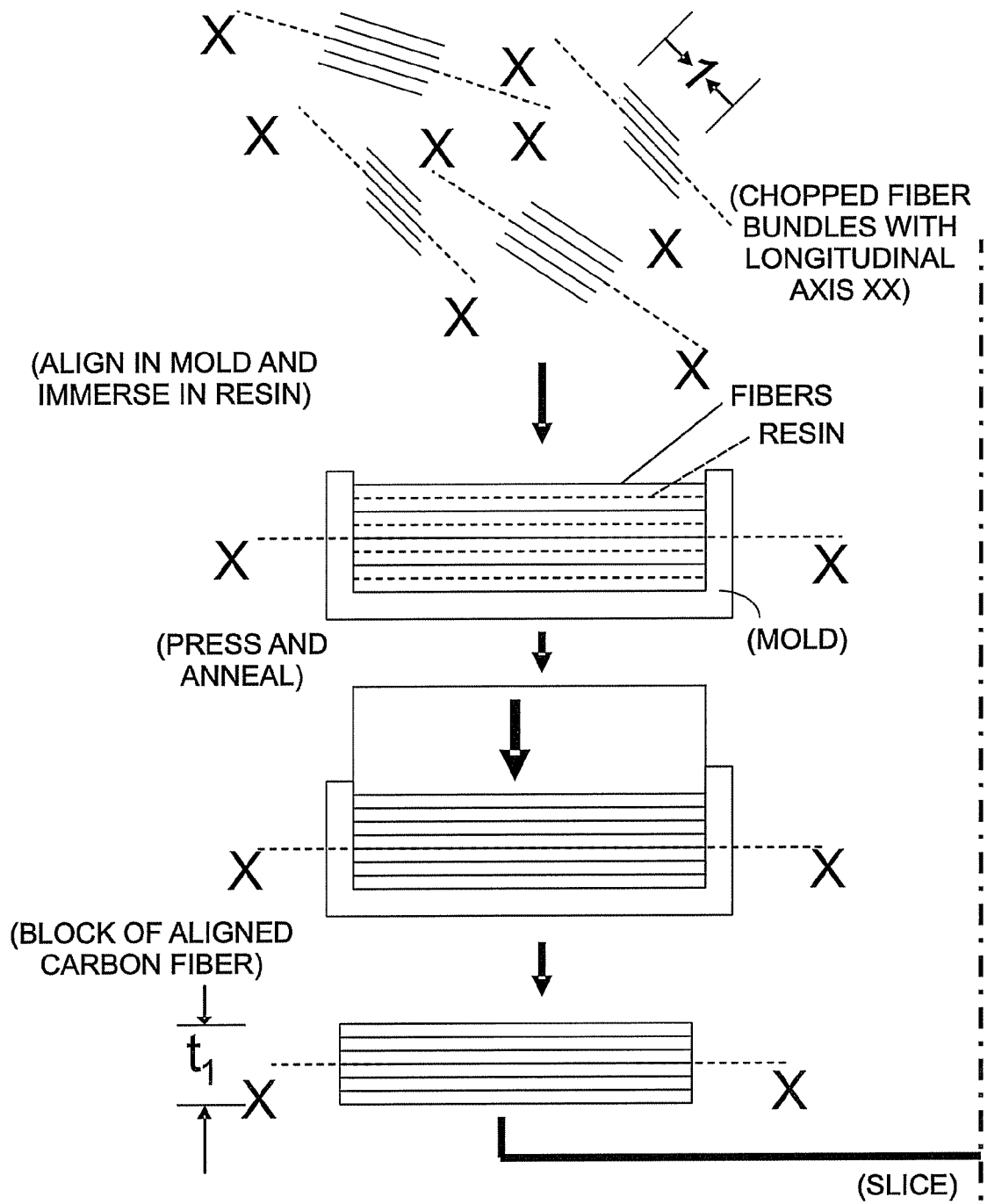
FIG. 2 composed of FIGS. 2A and 2B taken as a whole, is a depiction of the processes to form the composite film.
Figure 2B:
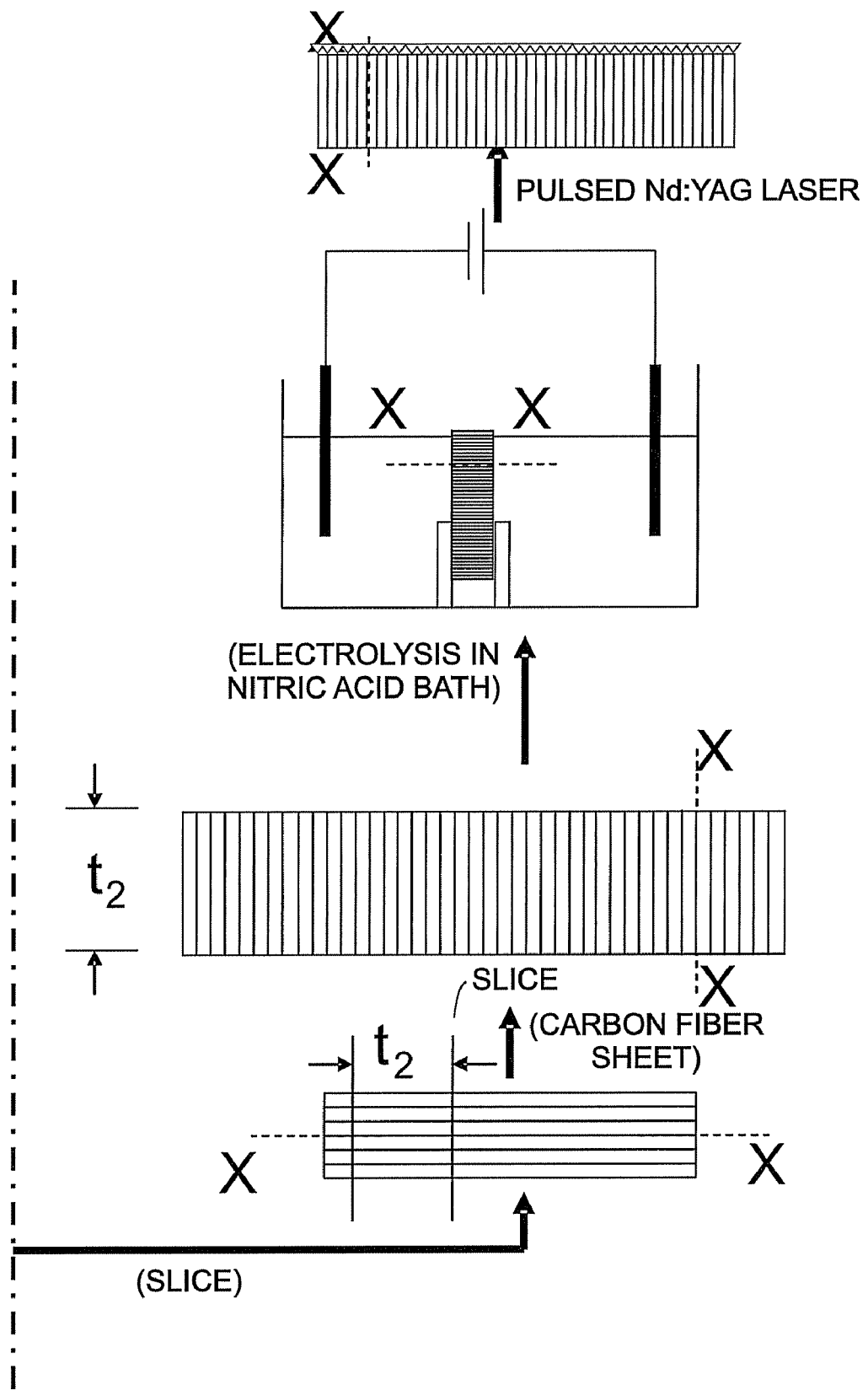

FIG. 2 depicts one exemplary method of manufacturing the composite film 100. The carbon fibers can either be chopped or can be purchased in chopped form. The carbon fibers in chopped form, which are available from graphite fiber makers, have average lengths "l" of about 10 millimeters to about 50 millimeters. As depicted in the FIG. 2, each bundle of the first set has a longitudinal axis XX that is parallel to the length of the fibers.

Various types of conductive carbon fibers are commercially available and may be classified according to their diameter, morphology, and degree of graphitization (morphology and degree of graphitization being interrelated). These characteristics are presently determined by the method used to synthesize the carbon fiber. For example, carbon fibers having diameters down to about 5 micrometers, and graphene ribbons parallel to the fiber axis (in radial, planar, or circumferential arrangements) are produced commercially by pyrolysis of organic precursors in fibrous form, including phenolics, polyacrylonitrile (PAN), or pitch. The carbon fibers produced by pyrolysis generally comprise microfibril aggregates with high crystallinity, and parts with low crystallinity or voids. The carbon fibers generally have a diameter of greater than or equal to about 1,000 nanometers (1 micrometer) to about 15 micrometers. Within this range fibers having sizes of greater than or equal to about 2, preferably greater than or equal to about 3, and more preferably greater than or equal to about 4 micrometers may be advantageously used. Also desirable within this range are fibers having diameters of less than or equal to about 14, preferably less than or equal to about 12, and more preferably less than or equal to about 11 micrometers.

As shown in the FIG. 2, the chopped carbon fibers are aligned in a mold. The carbon fibers are aligned such that the average inclination of the longitudinal axis XX of the chopped carbon fibers are arranged to be parallel to the bottom surface of the mold. Alignment of chopped carbon fibers is accomplished by putting the chopped fibers into a mold along the mold wall. The width of the mold is less than the length of the chopped carbon fibers. This dimensional constriction forces the chopped carbon fibers to be aligned in the mold.

Following alignment, the chopped fibers are immersed in an organic polymer in the mold. The organic polymer may be selected from a wide variety of thermoplastic polymers, thermosetting polymers, blend of thermoplastic polymers, or blends of thermoplastic polymers with thermosetting polymers. The organic polymer may also be a blend of polymers, copolymers, terpolymers, or combinations comprising at least one of the foregoing organic polymers. Examples of the organic polymer are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyvinyl ethers, polyvinyl thioethers, polyvinyl alcohols, polyvinyl ketones, polyvinyl halides, polyvinyl nitriles, polyvinyl esters, or the like, or a combination comprising at least one of the foregoing organic polymers.

Examples of thermosetting organic polymers include polyurethane, natural rubber, synthetic rubber, epoxy, phenolic, polyesters, polyamides, polysiloxanes, or the like, or combinations comprising at least one of the foregoing thermosetting polymers. Blends of thermosetting polymers as well as blends of thermoplastic polymers with thermosets can be utilized. An exemplary organic polymer is an elastomer having an elastic modulus of less than or equal to about $10^5$ Pascals. In an exemplary embodiment, a thermosetting organic polymer comprises polysiloxanes.

The immersed chopped carbon fibers are then subjected to pressurization and annealing. The immersed chopped carbon fibers are subjected to pressurization in a mold at pressures of about 1 kilogram to about 5 kilograms per square centimeters. A preferred pressure is about 4 kilograms per square centimeter. Following pressurization, the chopped carbon fibers are subjected to annealing at a temperature of about 80° C. to about 150° C. A preferred temperature is about 120° C. The annealing process results in the formation of a block of aligned carbon fibers. If the organic polymer is a thermosetting organic polymer, the annealing process can be used to cure the organic polymer.

As can be seen in the FIG. 2, the block of aligned carbon fibers has a thickness of about 10 millimeters to about 25 millimeters. The block of aligned carbon fibers generally comprises carbon fibers in an amount of about 20 volume percent (vol %) to about 40 vol %, based on the total volume of the block. A preferred amount of carbon fiber is about 30 vol %, based on the total volume of the block.

The block of aligned carbon fibers generally comprises the organic polymer in an amount of about 80 volume percent (vol %) to about 60 vol %, based on the total volume of the block. A preferred amount of the organic polymer is about 70 vol %, based on the total volume of the block.

The block of aligned carbon fibers is then removed from the mold and sliced in a direction perpendicular to the longitudinal axis XX of the carbon fibers to form a carbon fiber sheet. In an exemplary embodiment, the block is sliced with a microtome into carbon fiber sheets. Each carbon fiber sheet has a thickness $t_2$ (measured perpendicular to the longitudinal axis) of about 100 micrometer to about 2 millimeters. A preferred thickness is about 200 micrometers.

The carbon fiber sheet is then placed in an electrolytic bath comprising nitric acid to intercalate the carbon fibers with nitrate ($NO^{3-}$) ions. The applied voltage is about 1 volt to about 5 volts. The current is up to about 0.5 amperes and the time for maintaining the carbon fiber sheet in the electrolytic bath is from about 1 minute to about 10 minutes. An exemplary voltage is about 3 volts, with a current of about 0.3 amperes and a time of about 5 minutes.

Figure 3A:
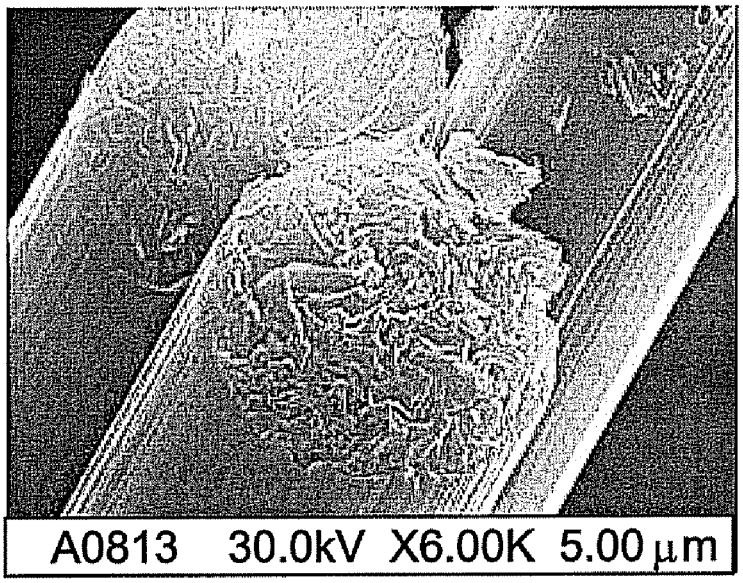
FIG. 3(a) is a photomicrograph showing a carbon fiber with non-fibrillated end faces.
Figure 3B:
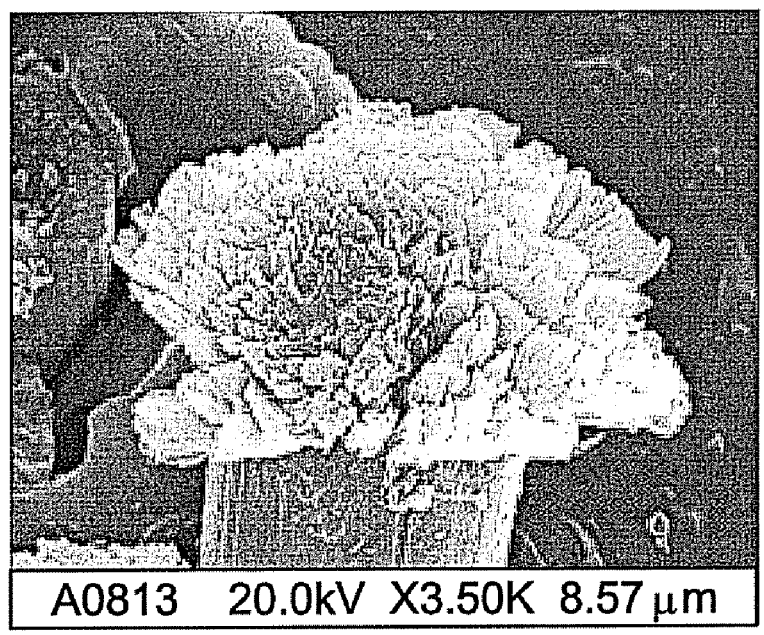
FIG. 3(b) is a photomicrograph showing a carbon fiber with fibrillated end faces.

Following the intercalation of the carbon fibers with the nitrate ions, the carbon fiber end faces will be expanded and fibrillated by exposing the end faces to a pulse laser. The fibrillation of the carbon fibers in the carbon fiber sheet produces the composite film. An exemplary laser is a neodymium-doped yttrium aluminum garnet (Nd:YAG) laser having a pulse width of 8 nanometers (nm) with an energy of 3 millijoules (mJ)/pulse. The change in the surface structure of the carbon fibers in the carbon fiber sheet due to the fibrillation of the end faces of the carbon fibers can be observed by comparing the photomicrographs displayed in the FIGS. 3(a) and 3(b). The FIG. 3(a) shows the end faces of the carbon fibers prior to fibrillation while FIG. 3(b) shows the end faces of the fibers after the fibrillation and expansion caused by the treatment with the laser. In the FIG. 3(a), the end face of the respective carbon fibers can be seen to have the same diameter as the rest of the carbon fiber. In the FIG. 3(b), the fibrillation and expansion of the end faces of the carbon fibers causes the end face to have a larger diameter than the column of the bundle of carbon fibers. As can be seen from the FIG. 3(b), the end faces of the carbon fibers have a surface area that is 110% to about 250%, specifically about 125% to about 210%, and more specifically about 130% to about 200%, greater than the cross-sectional area of the bundle of carbon fibers.

Figure 4A:
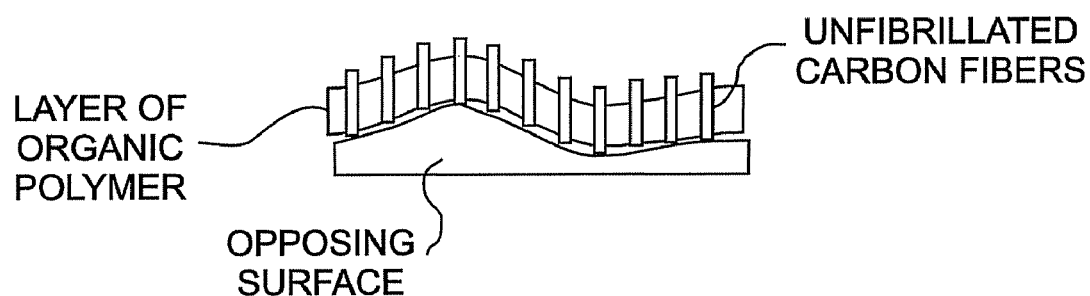
FIG. 4(a) is a depiction of a comparative composite film contacting an opposing surface; the non-fibrillated carbon fibers do not make proper contact with the opposing surface.
Figure 4B:
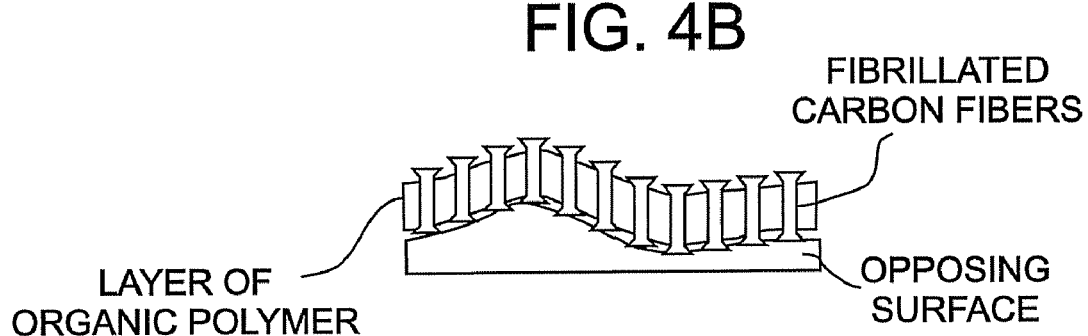
FIG. 4(b) is a depiction of a composite film (that comprises carbon fibers having fibrillated end faces) contacting an opposing surface; the fibrillated carbon fibers make proper contact with the opposing surface.

These fibrillated end faces provide the composite films with a substantial advantage over comparative composite films that have carbon fibers that do not have fibrillated end faces. The FIGS. 4(a) and 4(b) depict one of these advantages. FIG. 4(a) depicts a comparative composite film (whose end faces are not fibrillated) being in contact with an opposing curved surface. As can be seen, the contacts between the carbon fibers and the opposing curved surface is tenuous. There is very limited contact between the carbon fibers and the opposing curved surface in the comparative composite film as shown in the FIG. 4(a). On the other hand, in the FIG. 4(b), the composite film comprising the end faces that are fibrillated shows significantly better contact with the opposing curved surfaces. The fibrillated end faces also have a substantial affinity for oil, making it possible to smear the film surface with oil if desired. Oil can be used to improve the contact between the carbon fibers and an opposing surface. Fibrillating the end faces of the carbon fibers in the composite film thus improves the contact characteristics of the composite film surface with opposing surfaces. It also provides a mechanism for utilizing the excellent electrical and thermal characteristics (intrinsic to carbon fibers) in a variety of electrical and thermal applications.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A composite film comprising:
   a layer of an organic polymer, wherein the organic polymer is an elastomer; the organic polymer having an elastic modulus of less than or equal to about $10^5$ Pascals when measured at room temperature; and
   a bundle of carbon fibers disposed in the layer of organic polymer; each bundle comprising a column and an end face; each bundle also having a longitudinal axis that is substantially parallel to the column and passes through the center of the column; the end face of the carbon fiber bundle intercalated with nitrate ions and fibrillated so as to have a surface area measured perpendicular to the longitudinal axis that is about 110% to about 250% greater than the surface area of a cross-section of the carbon fiber bundle measured at the column.

2. An article comprising the composite film of claim 1.

\* \* \* \* \*